US006708676B2

(12) United States Patent
Akao et al.

(10) Patent No.: US 6,708,676 B2
(45) Date of Patent: Mar. 23, 2004

(54) EGR CONTROL UNIT AND EGR CONTROL METHOD

(75) Inventors: Yoshiyuki Akao, Yokohama (JP); Susumu Kohketsu, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 13 days.

(21) Appl. No.: 10/233,555

(22) Filed: Sep. 4, 2002

(65) Prior Publication Data

US 2003/0041845 A1 Mar. 6, 2003

(30) Foreign Application Priority Data

Sep. 4, 2001 (JP) ........................... 2001-267877
Aug. 7, 2002 (JP) ........................... 2002-229983

(51) Int. Cl.$^7$ ............................................. F02M 25/07
(52) U.S. Cl. ............................ 123/568.16; 123/568.21
(58) Field of Search ................... 123/568.11, 568.12, 123/568.16, 568.21, 568.22; 701/108; 73/117.3

(56) References Cited

U.S. PATENT DOCUMENTS

| | | | | | |
|---|---|---|---|---|---|
| 4,870,941 A | * | 10/1989 | Hisatomi | ............... | 123/568.16 |
| 5,014,203 A | * | 5/1991 | Miyazaki et al. | ........... | 701/108 |
| 5,113,835 A | | 5/1992 | Seki et al. | ............. | 123/568.16 |
| 5,190,017 A | * | 3/1993 | Cullen et al. | .......... | 123/568.16 |
| 5,727,533 A | * | 3/1998 | Bidner et al. | .......... | 123/568.16 |
| 6,044,826 A | * | 4/2000 | Bayerle et al. | ........ | 123/568.16 |
| 6,102,015 A | * | 8/2000 | Tsuyuki et al. | ........ | 123/568.16 |

FOREIGN PATENT DOCUMENTS

| | | |
|---|---|---|
| JP | 2727534 B2 | 12/1997 |
| JP | 9-317568 A | 12/1997 |

* cited by examiner

*Primary Examiner*—Willis R. Wolfe
(74) *Attorney, Agent, or Firm*—Birch, Stewart, Kolasch & Birch, LLP

(57) ABSTRACT

The present invention relates to an EGR control unit and EGR control method for controlling an EGR adjusting apparatus, and it is an object of the invention to calculate an EGR rate at a low cost and to control an operation of the EGR apparatus with high accuracy. The EGR control unit is made up of temperature detecting devices detect in-passage temperature at least two of an intake passage, an atmospheric air introduction passage located on the upstream side of the intake passage and communicated with the atmosphere and an EGR passage, an actual EGR rate calculating device for calculating a rate of an exhaust gas to an intake gas in an internal combustion engine on the basis of information on temperatures detected by the temperature detecting devices, and an EGR controller for controlling the EGR adjusting device through the use of the actual EGR rate calculated by the actual EGR rate calculating device.

28 Claims, 11 Drawing Sheets

F I G. 1
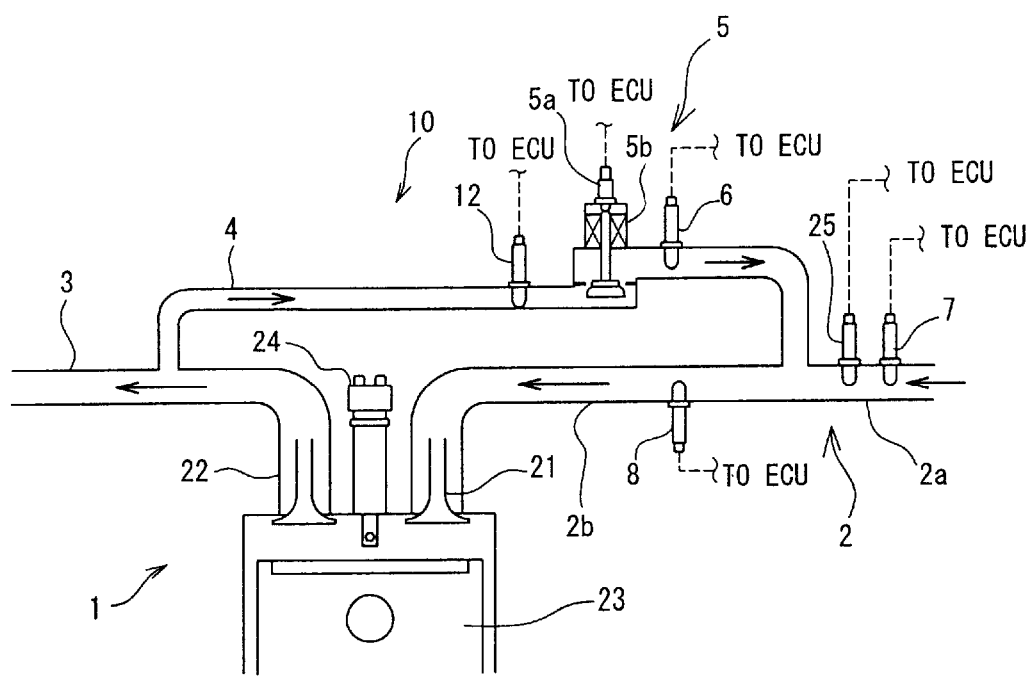

F I G. 5
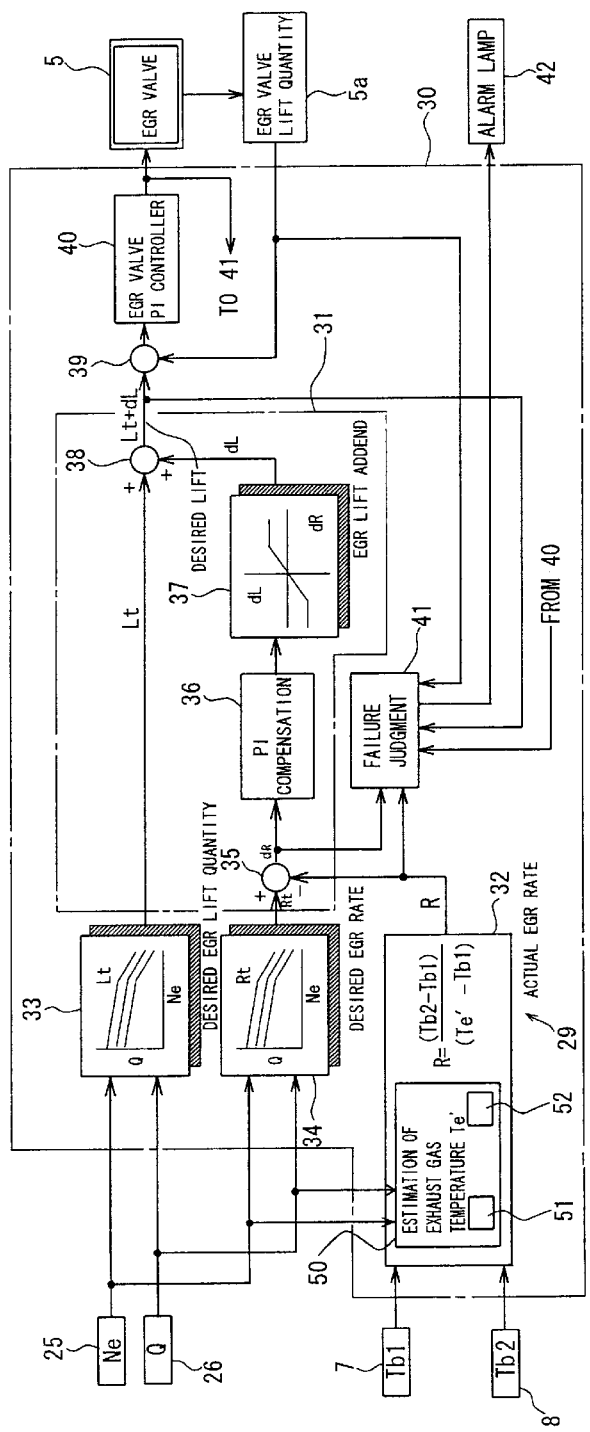

EGR CONTROL UNIT AND EGR CONTROL METHOD

BACKGROUND OF THE INVENTION

1. Field of the Invention

The present invention relates to an Exhaust Gas Recirculation (herein after EGR) control unit and EGR control method which are for calculating a rate (actual EGR rate) of an EGR gas, refluxed into a combustion chamber of an internal combustion engine, to fresh air and further for controlling an EGR adjusting device on the basis of the calculated actual ERG rate.

2. Description of the Related Art

So far, there has widely known an EGR apparatus in which a portion of an exhaust gas from an internal combustion engine (engine) is refluxed or returned into an intake gas (fresh air) to achieve the reduction of NOx.

In such type of EGR apparatus, intake and exhaust passages of the engine are connected through an EGR passage, and at an intermediate portion of this EGR passage, an EGR valve is placed which controls the reflux quantity of an exhaust gas (EGR gas). Moreover, a lift quantity of the EGR valve is controlled to create a target EGR rate according to driving conditions, thereby controlling the reflux quantity of the exhaust gas.

In this EGR apparatus, concretely, a target opening degree (target lift quantity) of the EGR valve is read out from a map on the basis of an engine speed and a fuel injection quantity, and the actual EGR valve lift quantity is detected through the use of a sensor so that the opening degree of the EGR valve is feedback-controlled on the basis of these actual lift quantity and target lift quantity.

Meanwhile, in the recent years, there have been known various types of techniques for detecting a failure of such EGR apparatus. For example, so far, there has widely been known a technique (first conventional technique) in which a judgment is made that a failure of the EGR valve has occurred when a deviation between the actual lift quantity and a target lift quantity exceeds a given threshold at the above-mentioned feedback control (for example, see Japanese Patent Publication No. 2727534).

In addition, there has also known a technique (second conventional technique) which is designed to detect a failure of an EGR apparatus by measuring the quantity of fresh air through the use of an airflow sensor. This technique is based upon the fact that the fresh air quantity decreases by an amount corresponding to a reflux quantity of an EGR gas during the operation of the EGR apparatus, and is designed to make a judgment as to the occurrence of a failure of the EGR apparatus on the basis of a fresh air quantity at the operation of the EGR apparatus.

Still additionally, Japanese Patent Laid-Open No. HEI 9-317568 discloses a technique (third conventional technique) in which a judgment is made on the occurrence of a failure of an EGR apparatus by detecting an excess intake air ratio through the use of a λ sensor. In this technique, for example, an $O_2$ sensor acting as the λ sensor is located in an intake passage existing on the downstream side of a junction between the intake passage and an EGR passage so that the actual EGR rate is calculated on the basis of the detection result thereof and a judgment as to the occurrence of a failure of an EGR valve is made by comparing this result with a target EGR rate (estimated EGR rate).

However, such conventional techniques create the following problems. For example, although the above-mentioned first conventional technique can detect a failure stemming from adherence of an EGR valve, it cannot detect failures (for example, failure of an EGR cooler or clogging of an EGR passage) other than the failure of the EGR valve.

Furthermore, in the case of the employment of the aforesaid second conventional technique, a general diesel engine, for example, is not equipped with an airflow sensor, and therefore, for applying this technique to the diesel engine, there is a need to place an airflow sensor additionally for the purpose of the detection of a failure of the EGR apparatus. Incidentally, the airflow sensor is relatively high in price, which leads to a considerable increase in cost.

Still furthermore, for the employment of the aforesaid third conventional technique, the required λ sensor (linear $O_2$ sensor) is expensive, which also causes a rise in cost, and there exists a problem of low reliability.

Therefore, there is a requirement for a technique which is capable of calculating an EGR rate at a low cost.

SUMMARY OF THE INVENTION

The present invention has been developed in order to meeting this requirement, and it is therefore an object of the invention not only to calculate an EGR rate at a low cost, but also to control an operation of an EGR apparatus with high accuracy, and even to securely make a judgment on a failure of an EGR apparatus on the basis of the calculated EGR rate.

For this purpose, in accordance with the present invention, there is provided an EGR control unit comprising an EGR passage for making a communication between an exhaust passage and an intake passage in an internal combustion engine, an EGR adjusting device including at least an EGR valve for opening and closing the EGR passage and drive means for driving the EGR valve, temperature detecting means detect in-passage temperature at least two passage of the intake passage, an atmospheric air introduction passage located on an upstream side of the intake passage and communicated with the atmosphere and the EGR passage, actual EGR rate calculating means for calculating a rate of an exhaust gas to an intake gas to the internal combustion engine on the basis of detection information from the temperature detecting means, and EGR control means for controlling the EGR adjusting device in accordance with the actual EGR rate calculated by the actual EGR rate calculating means.

Preferably, the temperature detecting means includes a first temperature detecting element placed in the EGR passage, a second temperature detecting element placed in the atmospheric air introduction passage, and a third temperature detecting element placed in the intake passage.

More preferably, the actual EGR rate calculating means is made to calculate the actual EGR rate R on the basis of an exhaust gas temperature Te, an atmospheric temperature Tb1 and an gas temperature Tb2 in the intake passage, respectively detected by the first, second and third temperature detecting elements, according to the following equation.

$$R=(Tb2-Tb1)/(Te-Tb1)$$

Furthermore, the temperature detecting means includes a second temperature detecting element placed in the atmospheric air introduction passage and a third temperature detecting element placed in the intake passage, and the actual EGR rate calculating means includes exhaust gas temperature estimating means for estimating an expected exhaust gas temperature on the basis of a driving condition of the internal combustion engine so that the actual EGR rate calculating means obtains the actual EGR rate as a function of an atmospheric temperature Tb1 detected by the second temperature detecting element, an intake passage gas temperature Tb2 detected by the third temperature detecting element and an expected exhaust gas temperature Te' obtained by the exhaust gas temperature estimating means.

In this case, preferably, the actual EGR rate calculating means calculates the actual EGR rate R according to the following equation.

$$R=(Tb2-Tb1)/(Te'-Tb1)$$

In addition, it is also appropriate that the exhaust gas temperature estimating means corrects the expected exhaust gas temperature Te' on the basis of a parameter which affects the exhaust gas temperature.

In this case, preferably, the exhaust gas temperature estimating means corrects the expected exhaust gas temperature Te' on the basis of the atmospheric temperature Tb1 detected by the second temperature detecting element.

Moreover, preferably, the exhaust gas temperature estimating means corrects the expected exhaust gas temperature Te' on the basis of a deviation between a reference outside air temperature at the time of the conversion of the expected exhaust gas temperature Te' into data and the atmospheric temperature Tb1.

Still moreover, it is also appropriate that the exhaust gas temperature estimating means corrects the expected exhaust gas temperature Te' on the basis of the actual EGR rate calculated by the actual EGR rate calculating means.

In this case, preferably, the exhaust gas temperature estimating means corrects the expected exhaust gas temperature Te' on the basis of a deviation between an assumed EGR rate corresponding to a driving condition of the internal combustion engine at the time of the conversion of the expected exhaust gas temperature Te' into data and the actual EGR rate.

Furthermore, it is also appropriate that the aforesaid temperature detecting means includes a first temperature detecting element placed in the EGR passage, a third temperature detecting element placed in the intake passage and a fourth temperature detecting element for detecting an outside air temperature at an upstream side of the atmospheric air introduction passage, and the aforesaid actual EGR rate calculating means includes atmospheric temperature estimating means for estimating an atmospheric temperature in the atmospheric air introduction passage on the basis of the outside air temperature detected by the fourth temperature detecting element and the EGR rate calculating means obtains an actual EGR rate on the basis of an expected atmospheric temperature Tb1' obtained by the atmospheric temperature estimating means, a gas temperature Tb2 in the intake passage detected by the third temperature detecting element and an exhaust gas temperature Te detected by the first temperature detecting element.

In this case, preferably, the actual EGR rate calculating means calculates an actual EGR rate R according to the following equation.

$$R=(Tb2-Tb1')/(Te-Tb1')$$

Moreover, preferably, the atmospheric temperature estimating means corrects the expected atmospheric temperature Tb1' on the basis of a parameter which affects an exhaust gas temperature.

Still furthermore, it is also appropriate that the aforesaid temperature detecting means includes a fourth temperature detecting element for detecting an outside air temperature at an upstream side of the atmospheric air introduction passage and a third temperature detecting element placed in the intake passage, and the aforesaid actual EGR rate calculating means includes an exhaust gas temperature estimating means for estimating an expected exhaust gas temperature on the basis of a driving condition of the internal combustion engine and an atmospheric temperature estimating means for estimating an atmospheric temperature in the atmospheric air introduction passage on the basis of the outside air temperature detected by the fourth temperature detecting element and the actual EGR rate calculating means obtains an actual EGR rate on the basis of an expected atmospheric temperature Tb1' obtained by the atmospheric temperature estimating means, a gas temperature Tb2 in the intake passage detected by the third temperature detecting element and an expected exhaust gas temperature Te' obtained by the exhaust gas temperature estimating means.

In this case, preferably, the actual EGR rate calculating means calculates an actual EGR rate according to the following equation.

$$R=(Tb2-Tb1')/(Te'-Tb1')$$

In addition, it is also appropriate that the EGR control means controls the EGR adjusting device so that the actual EGR rate becomes a target EGR rate set in accordance with a driving condition of the internal combustion engine.

Still additionally, it is also appropriate that the EGR adjusting device includes EGR valve opening degree detecting means for detecting an actual opening degree of the EGR valve, and the EGR control means controls the EGR adjusting device so that the actual opening degree of the EGR valve detected by the EGR valve opening degree detecting means becomes a target opening degree set in accordance with a driving condition of the internal combustion engine and controls the EGR adjusting device on the basis of a deviation between a target EGR rate set in accordance with the driving condition of the internal combustion engine and the actual EGR rate for correcting the actual opening degree of the EGR valve.

Yet additionally, it is also appropriate that the EGR control means makes a judgment as to the presence or absence of a failure of the EGR adjusting device on the basis of a result of comparison between a target EGR rate set in accordance with a driving condition of the internal combustion engine and an actual EGR rate calculated by the actual EGR rate calculating means.

In this case, preferably, the EGR adjusting device includes EGR valve opening degree detecting means for detecting the actual opening degree of the EGR valve, and when a judgment shows the presence of a failure of the EGR adjusting device, the EGR control means makes a judgment to locate a place of the failure in the EGR adjusting device on the basis of a target opening degree of the EGR valve set in accordance with a driving condition of the internal combustion engine and an actual opening degree detected by the EGR valve opening degree detecting means.

Furthermore, in accordance with the present invention, there is provided an EGR control method of controlling an EGR adjusting device including at least an EGR passage for making a communication between an exhaust passage and an intake passage in an internal combustion engine, an EGR valve for opening and closing the EGR passage and drive means for driving the EGR valve, an actual EGR rate to an intake gas to the internal combustion engine being calculated on the basis of information on in-passage temperatures of at least two of the intake passage, an atmospheric air introduction passage located on the upstream side of the intake passage and communicated with atmosphere and the EGR passage so that the EGR adjusting device is controlled on the basis of the calculated actual EGR rate.

Preferably, the actual EGR rate is calculated on the basis of the information on in-passage temperatures of the intake passage, the atmospheric air introduction passage and the EGR passage.

More preferably, the actual EGR rate R is calculated according to the following equation on the basis of an exhaust gas temperature Te in the EGR passage, an atmospheric temperature Tb1 in the atmospheric air introduction passage and an gas temperature Tb2 in the intake passage.

$$R=(Tb2-Tb1)/(Te-Tb1)$$

In this connection, the actual EGR rate R can also be calculated according to the following equation on the basis of an expected exhaust gas temperature Te' based on an engine driving condition, an atmospheric temperature Tb1 in the atmospheric air introduction passage and a gas temperature Tb2 in the intake passage.

$$R=(Tb2-Tb1)/(Te'-Tb1)$$

Moreover, the actual EGR rate R can also be calculated according to the following equation on the basis of an exhaust gas temperature Te in the EGR passage, an expected atmospheric temperature Tb1' based on an outside air temperature at an upstream side of the atmospheric air introduction passage and a gas temperature Tb2 in the intake passage.

$$R=(Tb2-Tb1')/(Te-Tb1')$$

In addition, it is also appropriate that the EGR adjusting device is controlled so that the actual EGR rate becomes a target EGR rate set in accordance with a driving condition of the internal combustion engine.

Still additionally, it is also appropriate that the EGR adjusting device includes EGR valve opening degree detecting means for detecting an actual opening degree of the EGR valve, while the EGR adjusting device is controlled so that the actual opening degree of the EGR valve detected by the EGR valve opening degree detecting means becomes a target opening degree set in accordance with a driving condition of the internal combustion engine and the EGR adjusting device is controlled on the basis of a deviation between a target EGR rate set in accordance with a driving condition of the internal combustion engine and an actual EGR rate to correct the actual opening degree of the EGR valve.

Yet additionally, it is also appropriate that a judgment on the presence or absence of a failure of the EGR adjusting device is made on the basis of a result of comparison between the target EGR rate set in accordance with the driving condition of the internal combustion engine and the actual EGR rate calculated by the actual EGR rate calculating means.

In this case, preferably, the EGR adjusting device includes EGR valve opening degree detecting means for detecting an actual opening degree of the EGR valve, and when the judgment shows the presence of a failure in the EGR adjusting device, a judgment for locating a place of a failure in the EGR adjusting device is made on the basis of a target opening degree of the EGR valve set in accordance with a driving condition of the internal combustion engine and the actual opening degree detected by the EGR valve opening degree detecting means.

BRIEF DESCRIPTION OF THE DRAWINGS

FIG. 1 illustratively shows a configuration of an essential part of an EGR control unit according to a first embodiment of the present invention;

FIG. 5 is a block diagram taking note of functions of an EGR control unit according to a second embodiment of the invention;

DESCRIPTION OF THE PREFERRED EMBODIMENTS

Figure 2:
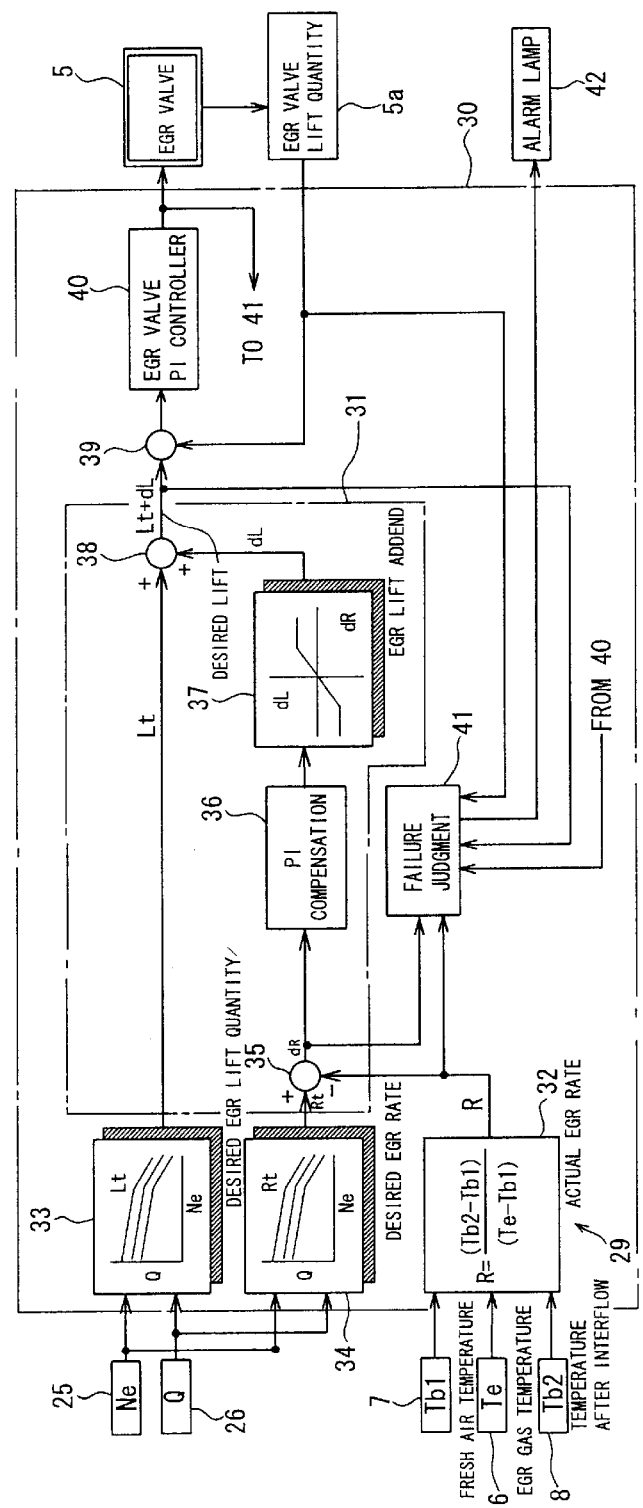
FIG. 2 is a block diagram taking note of functions of the EGR control unit according to the first embodiment of the invention.

Referring to the drawings, a description will be given hereinbelow of an EGR control unit according to a first embodiment of the present invention. FIG. 1 shows a configuration of an essential part thereof illustratively, and FIG. 2 is a block diagram taking note of essential functions thereof.

As FIG. 1 shows, an EGR apparatus (EGR adjusting device) 10 is provided between an intake-system 2 and an exhaust-system (exhaust passage) 3 in an engine (internal combustion engine) 1, thereby refluxing or returning a portion of an exhaust gas to the intake-system 2. The EGR apparatus 10 is mainly made up of an EGR passage 4 for establishing a connection between the intake-system 2 and the exhaust-system 3 and an EGR valve 5 for opening and closing the EGR passage 4. In the following description, an exhaust gas refluxed from the EGR passage 4 to the intake-system 2 will be referred to hereinafter as an "EGR gas".

The EGR valve 5 is a valve for controlling a quantity of the EGR gas to be refluxed to the intake-system 2, and an actuator (drive means) 5b is provided for the openings and closures of the EGR valve 5. Incidentally, as the actuator, there are employable various types of actuators, including a solenoid valve whose driving conditions are electrically controllable and a diaphragm whose driving conditions are controllable in accordance with supply states of a working fluid such as air.

The means for opening and closing the EGR valve 5 is not limited to the aforesaid solenoid valve but, for example, a means based on a negative or positive pressure of a working fluid such as air is also employable. The lift quantity of the EGR valve 5 is designed to be controlled in accordance with a control signal from a control means (ECU) which will be mentioned later, thus altering the substantial cross-sectional area of the EGR passage 4.

Moreover, for this EGR valve 5, there is provided a stroke sensor (or lift quantity sensor) 5a serving as an EGR valve opening degree detecting means to detect a lift quantity (that is, an opening degree) of the EGR valve 5. The lift quantity of the EGR valve 5 is feedback-controlled on the basis of the detection information from the stroke sensor 5a.

Although a detailed description will be omitted, the EGR apparatus 10 further includes a pressure sensor 12 for detecting a pressure of an EGR gas. Although not explained particularly, in FIG. 1, reference numeral 21 designates an intake valve, numeral 22 depicts an exhaust valve, numeral 23 represents a piston, numeral 24 denotes a fuel injection valve, and numeral 25 signifies an intake pressure sensor.

Still moreover, in the EGR passage 4, a temperature sensor (first temperature detecting element) 6 is placed to detect a temperature Te of an EGR gas passing through the EGR passage 4. Yet moreover, a temperature sensor (second temperature detecting element) 7 for detecting a temperature (atmospheric temperature) Tb1 of fresh air in the intake-system 2 and a temperature sensor (third temperature detecting element) 8 for detecting a temperature (gas temperature in the intake passage) Tb2 of an interflow (mixed) gas forming a mixture of the EGR gas and the fresh air are placed on the upstream and downstream sides of the junction of the intake-system 2 with the EGR passage 4, respectively. These temperature sensors 6 to 8 constitute a temperature detecting means. In the following description, in the intake-system 2, a section on the upstream side of the junction with the EGR passage 4 will be referred to as an "atmospheric air introduction passage 2a" while a section on the downstream side thereof will be referred to simply as an "intake passage 2b".

As FIG. 2 shows, in the engine 1, there is provided an EGR rate detecting device 29 for detecting or calculating a rate (actual EGR rate) of an EGR gas actually refluxed to the intake-system 2. In this case, the EGR rate detecting device 29 is composed of the aforesaid temperature sensors 6 to 8 and an actual EGR rate calculating means 32 put in an ECU (EGR control means) 30 shown in FIG. 2, and the actual EGR rate calculating means 32 is made to calculate an actual EGR rate R on the basis of the detection information from the temperature sensors 6 to 8.

Figure 3:
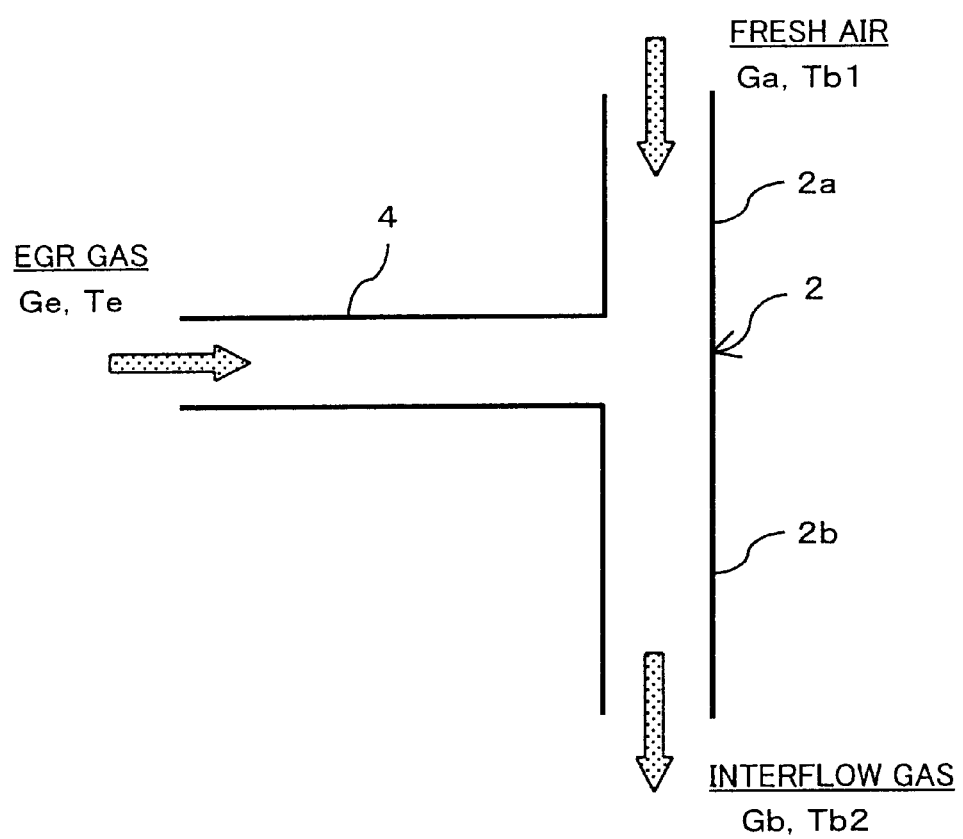
FIG. 3 illustratively shows flows of an exhaust gas and a fresh air in the EGR control unit according to the first embodiment of the invention.

A description will be given hereinbelow of a method of calculating the actual EGR rate R through the use of the actual EGR rate calculating means 32. As FIG. 3 shows, the relationship given by the following equation (1) exists among a flow rate Ge of an EGR gas supplied from the EGR passage 4, a flow rate Ga of fresh air supplied from the atmospheric air introduction passage 2a and a flow rate Gb of an interflow gas, and from this equation (1), the actual EGR rate R can be expressed as the following equation (2).

$$Gb=Ga+Ge \tag{1}$$

$$R=Ge/Gb=Ge/(Ga+Ge) \tag{2}$$

Accordingly, if flow sensors (airflow sensors) capable of detecting the EGR gas flow rate Ge and the fresh air flow rate Ga are respectively provided in the EGR passage 4 and the atmospheric air introduction passage 2a, the actual EGR rate is easily obtainable. However, in general, the airflow sensor is expensive, and this configuration causes an increase in cost.

For this reason, the actual EGR rate calculating means 32 is designed to calculate the actual EGR rate according to the following method on the basis of the information from the aforesaid temperature sensors 6 to 8.

First of all, in this case, since it is possible to assume that the specific heat of each of the gases is constant, the relationship in heat quantity (calorie) can be expressed by the following equations (3) and (4).

$$Gb \cdot Tb2 = Ga \cdot Tb1 + Ge \cdot Te \tag{3}$$

$$\therefore Tb2 = (Ga/Gb) \cdot Tb1 + (Ge/Gb) \cdot Te \tag{4}$$

The following equations (5) and (6) are given by substituting the above-mentioned equations (1) and (2) into the equation (4).

$$Tb2 = (1-R) \cdot Tb1 + R \cdot Te \tag{5}$$

$$\therefore R = (Tb2-Tb1)/(Te-Tb1) \tag{6}$$

Thus, the actual EGR rate calculating means 32 can calculate the actual EGR rate by using, as parameters, the temperatures of the EGR gas, the fresh air (atmosphere) and the interflow gas (gas in the intake passage).

In addition, as FIG. 2 shows, the ECU 30 includes a lift quantity setting means (target EGR valve opening degree setting means) 33 made to set a target opening degree (target lift quantity) Lt of the EGR valve 5 in accordance with a driving condition of the engine 1. This lift quantity setting means 33 is provided in the form of a map, and the target lift quantity Lt is set on the basis of an engine speed Ne from an engine speed sensor 25 and a fuel injection quantity Q from a rack position sensor 26.

Still additionally, as FIG. 2 shows, the ECU 30 further includes a target EGR rate setting means 34 made to set a target EGR rate Rt in accordance with a driving condition of the engine 1. In this case, as in the case of the aforesaid lift quantity setting means 33, the target EGR rate setting means 34 is provided in the form of a map to set a target EGR rate Rt by using, as parameters, an engine speed Ne and a fuel injection quantity Q.

Yet additionally, the ECU 30 further includes a correcting means 31 corrects the target lift quantity Lt of the EGR valve 5, set by the aforesaid lift quantity setting means 33, on the basis of a deviation dR between the actual EGR rate R calculated by the actual EGR rate calculating means 32 and the target EGR rate Rt set by the target EGR rate setting means 34.

This correcting means 31 is composed of a deviation calculating means (adder) 35 for calculating a deviation dR between an actual EGR rate R and a target EGR rate Rt, a PI compensator 36 for PI-compensating for this deviation dR, a correction quantity setting means 37 for setting a lift correction quantity dL for the EGR valve 5 on the basis of the deviation dR, and an adder 38 for adding the lift correction quantity dL to the target lift quantity Lt.

Moreover, the ECU 30 is made to newly output, as the target lift quantity of the EGR valve 5, the lift quantity obtained by the correction in the correcting means 31 (that is, the lift quantity outputted from the adder 38). This target lift quantity is outputted through a PI controller 40 to the EGR valve 5.

Still moreover, the actual lift quantity of the EGR valve 5 is detected by a stroke sensor attached to the EGR valve 5, and this actual lift quantity is feedbacked through an adder 39.

The implementation of this control enables the operation of the EGR valve 5 to be controlled with high response and high accuracy.

Meanwhile, in this ECU 30, there is provided a failure judging means 41 for detecting a failure of the EGR valve 5. This failure judging means 41 is for making a judgment as to a failure of the EGR apparatus 10 on the basis of the deviation dR between an actual EGR rate R calculated by the aforesaid actual EGR rate calculating means 32 and a target EGR rate Rt set by the target EGR rate setting means 34, and this failure judging means 41, the target EGR rate setting means 34, the temperature sensors 6 to 8, the actual EGR rate calculating means 32 and the ECU (control means) 30 organize a failure judging device for the EGR apparatus 10. In this case, when a state given by the following equation (7) continues for longer than a predetermined period of time (for example, 3 sec), the failure judging means 41 is desired to make a judgment that a failure has occurred in the EGR apparatus 10 for some reason.

$$|(R-Rt)/Rt| > \alpha \text{ (where } \alpha \text{ denotes a predetermined value; for example, 10\%)} \quad (7)$$

That is, if the EGR apparatus 10 is in an normally operating condition, the actual EGR rate R and the target EGR rate Rt will agree substantially with each other, and if the ratio of the deviation between the actual EGR rate R and the target EGR rate Rt with respect to the target EGR rate Rt is larger than a value determined in consideration of a calculation error on the actual EGR rate R, a judgment is made as the occurrence of a failure of the EGR apparatus 10.

In addition, by using additionally information on an actual lift quantity of the EGR valve 5 obtained by the stroke sensor 5a and a target lift quantity corrected by the correcting means 31, the failure judging means 41 can make a decision as to whether the failure of the EGR apparatus 10 stems from a failure of the EGR valve 5 or originates from other causes, for example, the pipeline clogging of the EGR passage 4 or the like.

That is, the substantial agreement of the actual lift quantity of the EGR valve 5 with the target lift quantity indicates the normal operation of the EGR valve 5. Therefore, in a state satisfying the above-mentioned equation (7), if the actual lift quantity and the target lift quantity agree approximately with each other, a decision can be made that an abnormality has occurred in places other than the EGR valve 5. In such a case, it can be considered that a pipeline clogging has occurred, for example, in the EGR passage 4 or the like.

On the other hand, in a state satisfying the aforesaid equation (7), if a large difference exists between the actual lift quantity and the target lift quantity, it can be considered that, due to the occurrence of a failure of the EGR valve 5, the target EGR rate Rt and the actual EGR rate R have not agreed with each other. That is, in this case, a judgment can be made that the EGR valve 5 is in a failure condition.

As described above, in the case of a failure of the EGR apparatus 10, the failure judging means 41 can make a judgment as to whether the failure stems from a failure of the EGR valve 5 or originates from the clogging of a pipeline or the like.

Furthermore, when detecting a failure of the EGR apparatus 10, the failure judging means 41 lights an alarm lamp 42 corresponding to this failure and stores this information as diagnosis information in a storage device, not shown. In this case, the fact of the failure of the EGR valve 5 or a failure other than this EGR valve failure is stored therein.

Figure 4:
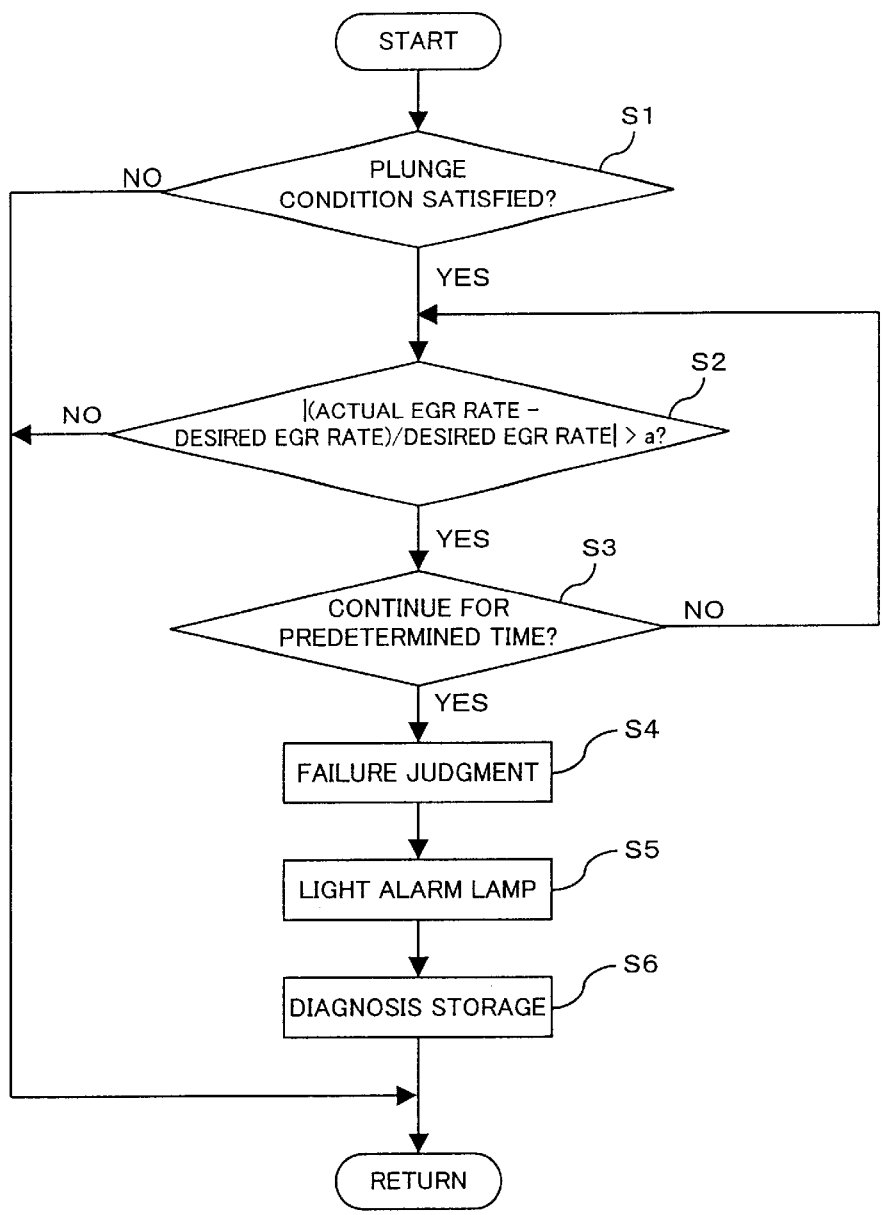
FIG. 4 is a flow chart useful for explaining an operation of the EGR control unit according to the first embodiment of the invention.

The EGR control unit according to the first embodiment of the present invention is arranged as described above, and a judgment on a failure of the EGR apparatus 10 is made, for example, according to a flow chart shown in FIG. 4.

First of all, in a step S1, a decision is made as to whether a plunge (entry) condition for a decision on a failure of the EGR apparatus 10 is satisfied or not. This plunge condition includes, for example, predetermined conditions, such as a key switch being in an on state and an exhaust brake being in an off state. If the step S1 shows the satisfaction of the plunge condition, the operational flow advances to a step S2. Otherwise, the operational flow returns.

In the step S2, a ratio $|(R-Rt)/Rt|$ of a deviation between an actual EGR rate R and a target EGR rate Rt to the target EGR rate Rt is calculated to make a decision as to whether or not the calculated value is larger than a predetermined value $\alpha$ [see the equation (7)].

In this case, in the target EGR rate setting means of the ECU 30, the target EGR rate Rt is set on the basis of an engine speed Ne and a fuel injection quantity Q. Moreover, in the actual EGR rate calculating means 32, the actual EGR rate R is calculated as a function of the detection information from the temperature sensors 6 to 8.

Following this, upon the satisfaction of the equation (7), the operational flow advances to a step S3, otherwise it returns. The step S3 is for making a decision as to whether or not the state in which the aforesaid deviation ratio is larger than the predetermined value a continues for a predetermined period of time.

If the decision of the step S3 shows that it has continued for the predetermined period of time, a step S4 follows to judge that a failure of the EGR apparatus 10 has occurred. In this connection, this failure judgment is made by the failure judging means 41 of the ECU 30. Upon the judgment of the failure of the EGR apparatus 10, a step S5 follows to light the alarm lamp 42, then followed by a step S6 to store the failure of the EGR apparatus 10 as diagnosis information. Subsequently, the failure judgment control comes to an end.

Secondly, referring to FIG. 2, a description will be given hereinbelow of the entire control of the EGR apparatus 10.

First, the lift quantity setting means 33 of the ECU 30 sets a target lift quantity Lt on the basis of an engine speed Ne and a fuel injection quantity Q.

In addition, the correcting means 31 sets a correction quantity dL with respect to the target lift quantity Lt on the basis of the target EGR rate Rt set by the aforesaid target EGR rate setting means 34 and the actual EGR rate R calculated by the actual EGR rate calculating means 32 and adds this correction quantity dL to the target lift quantity Lt. This value Lt+dL is newly set as a target lift quantity and outputted to the EGR valve 5.

Still additionally, an actual lift quantity of the EGR valve 5 is detected by the stroke sensor 5a, and this actual lift quantity is feedbacked through the adder 39 to control the opening/closure state of the EGR valve 5 so that the actual lift quantity assumes a target opening degree.

Meanwhile, the information from this stroke sensor 5a and the target lift quantity (Lt+dL) obtained by the correction in the correcting means 31 are inputted to the failure judging means 41.

On the basis of these information and the information on the deviation between the target EGR rate and the actual EGR rate, the failure judging means 41 makes a judgment as to whether the failure of the EGR apparatus 10 stems from a failure of the EGR valve 5 or originates from other causes.

If the actual lift quantity of the EGR valve 5 agrees substantially with the target lift quantity thereof, it can be considered that the EGR valve 5 is on the normal operation;

therefore, in this case, when the ratio of the deviation between the actual EGR rate R and the target EGR rate Rt is larger than the predetermined value α, a judgment is made that the failure of the EGR apparatus 10 has occurred due to the clogging of the EGR passage 4 or the like, while if a large difference exists between the actual lift quantity and target lift quantity of the EGR valve 5, a judgment is made to the failure of the EGR valve 5.

As described above, the EGR control unit according to the first embodiment can create an advantage of calculating the actual EGR rate simply through the use of the temperature sensors 6 to 8 obtainable at a relatively low cost without using high-priced sensors such as an airflow sensor and can make a decision on failure of the EGR apparatus 10 on the basis of the actual EGR rate to hold down an increase in cost to the utmost.

Moreover, the actual lift quantity of the EGR valve 5 is feedback-controlled on the basis of a target lift quantity Lt, and the actual lift quantity of the EGR valve 5 is controlled to become a target lift quantity corrected on the basis of the deviation between the target EGR rate Rt and the actual EGR rate R; therefore, there is an advantage of achieving the improvement of the response and control accuracy of the EGR valve 5 at a transition where the EGR rate varies considerably.

Still moreover, when a judgment is made, on the basis of the target EGR rate Rt and the actual EGR rate R, that a failure of the EGR apparatus has occurred, a judgment is made on the basis of the deviation between the target opening degree and actual opening degree of the EGR valve 5 as to whether or not a failure of the EGR valve 5 has occurred; therefore, it is possible to make a judgment as to whether the failure of the EGR apparatus 10 is due to the failure of the EGR valve 5 or due to other causes.

Furthermore, a description will be given hereinbelow of a modification of the EGR control unit according to the first embodiment of the present invention. Although in the above-described embodiment the actual EGR rate is calculated according to the relationship in heat quantity on the assumption that the specific heat of each gas is constant, in this modification the actual EGR rate is calculated in consideration of the specific heat (Cp) of each gas.

First, the specific heat (Cp) of each gas can be calculated as a function of a temperature of each gas according to the following equation (8).

$$Cp = 0.244 - 5.747 \times 10^{-5} \times T + 1.739 \times 10^{-7} \times T^2 - 1.100 \times 10^{-10} \times T^3 + 2.210 \times 10^{-14} \times T^4 \qquad (8)$$

This equation (8) is shown by a quartic approximate expression of specific heat at constant pressure in an air standard state given by the Society of Mechanical Engineers, and in the equation (8), T signifies a gas temperature at each place.

Still furthermore, the heat quantity Q of a gas at each place can be given by the following equation (9).

$$Q = Cp \times G \times T \qquad (9)$$

where G represents a flow rate and T depicts a gas temperature.

When fresh air, an EGR gas and each specific heat of an interflow gas are taken as Cp1, Cp2 and Cp3, respectively, referring to the equations (3) and (9) in the above-described embodiment and considering the specific heat Cp of a gas at each place, the relationship in heat quantity can be expressed by the following equations (10) and (11).

$$Cp3 \times Gb \times Tb2 = Cp1 \times Ga \times Tb1 + Cp2 \times Ge \times Te \qquad (10)$$

$$\therefore Tb2 = (Ga/Gb) \cdot Cp1 \cdot Tb1/Cp3 + (Ge/Gb) \cdot Cp2 \cdot Te/Cp3 \qquad (11)$$

In this case, Cp1, Cp2 and Cp3 are a function of a calculable temperature T, and the actual EGR rate can be calculated according to the same method as that in the above-described embodiment.

That is, the following equations (12) and (13) are derived by substituting the aforesaid equations (1) and (2) into the equation (11).

$$Tb2 = (1-R) \cdot Cp1 \cdot Tb1/Cp3 + R \cdot Cp2Te/Cp3 \qquad (12)$$

$$\therefore R = (Tb2 - Cp1 \cdot Tb1/Cp3)/(Cp2 \cdot Te/Cp3 - Cp1 \cdot Tb1/Cp3) \qquad (13)$$

Thus, this modification can also calculate an actual EGR rate by using the temperatures of an EGR gas, fresh air and an interflow gas as parameters.

In this connection, for example, even in a range from a room temperature to 300° C. (the maximum value of the temperature of an EGR gas cooled by an EGR cooler), some difference appears between when the specific heat is constant as taken in the above-described embodiment and when the specific heat is handled as a function of temperature as taken in the above-described modification.

Accordingly, in a case in which the level of an exhaust gas such as NOx of an engine employing the EGR control based on the actual EGR rate calculation according to the present invention sufficiently reaches a desired level of the exhaust gas, even if the EGR rate is calculated on the condition that the specific heat is constant, the error correction is unnecessary, which achieves the simplification of arithmetic in the interior of the ECU to shorten the operation time.

However, in a case in which a little difference exists between a level of an exhaust gas of the engine employing the EGR control based on the actual EGR rate calculation according to the present invention and a desired level of the exhaust gas, it is preferable to correct the EGR rate, calculated on the condition that the specific heat is constant for the improvement of control accuracy, through the use of a correction coefficient predetermined according to a driving condition of the engine, or to select the actual EGR rate calculating method considering the specific heat in the above-described modification. Incidentally, it is also acceptable to calculate the actual EGR rate through the use of a lower-order (second-order or third-order) approximate expression in the aforesaid equation (8) for the purpose of the simplification of the calculation steps.

Furthermore, referring to FIG. 5, a description will be given hereinbelow of an EGR control unit according to a second embodiment of the present invention. This second embodiment differs in only calculating method for the actual EGR rate R from the above-described first embodiment. Accordingly, the following description will mainly be made of the actual EGR rate R calculating method. The others are the same as those in the first embodiment, and the description thereof will be omitted for brevity. Moreover, in the second embodiment, the components common to those in the first embodiment are marked with the same reference numerals as those used in the first embodiment, and the description thereof will be omitted for simplicity.

Although the above-described first embodiment detects the temperature Te of an EGR gas through the use of the temperature sensor 6, in the second embodiment the EGR gas temperature is estimated from an engine driving condition and the actual EGR rate is calculated on the basis of the estimated EGR gas temperature.

Giving a detailed description, as shown in FIG. 5, the temperature (atmospheric temperature) Tb1 of fresh air is detected by a temperature sensor (second temperature detecting element) 7 placed in the atmospheric air introduction passage 2a, while the temperature (gas temperature inside the intake passage 2b) Tb2 of an interflow gas forming a mixture of an EGR gas and the fresh air is detected by a temperature sensor (third temperature detecting element) 8 placed in the intake passage 2b. Additionally, as shown in the illustration, an actual EGR rate calculating means 31 is equipped with an exhaust gas temperature estimating means 50 which is made to estimate an exhaust gas temperature (that is, an EGR gas temperature) Te' on the basis of a driving condition of an internal combustion engine producing the engine 1.

In this case, the exhaust gas temperature estimating means 50 includes an exhaust gas temperature estimating map 51 (see FIG. 6) for estimating the exhaust gas temperature Te' and a correction quantity calculating map 52 (see FIGS. 7 and 8) for calculating a correction quantity to be used for the correction of the exhaust gas temperature Te' estimated by the exhaust gas temperature estimating map 51.

Figure 6:
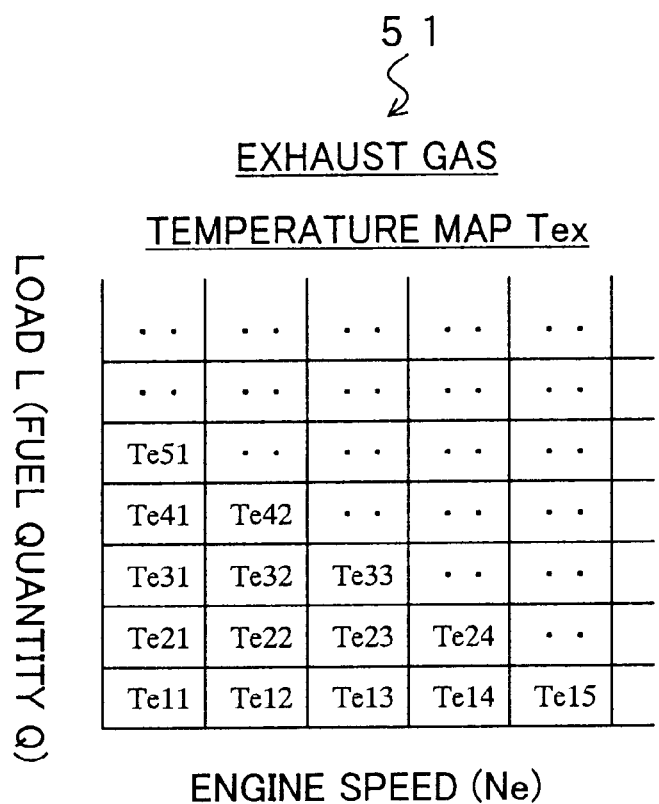
FIG. 6 is an illustration useful for explaining an operation of the EGR control unit according to the second embodiment of the invention.

As FIG. 6 shows, of these maps, the exhaust gas temperature estimating map 51 stores exhaust gas temperature data based on an engine speed Ne and a load L (fuel injection quantity Q), and an exhaust gas temperature Te' is estimated by being read out from the map 51 on the basis of a diving condition of the engine 1.

Meanwhile, naturally, between the time of an expected exhaust gas temperature Te' being converted into data in the exhaust gas temperature estimating map 51 and the time of the exhaust gas temperature estimation, differences can appear in values of parameters [concretely, atmospheric (fresh air) temperatures, oil temperatures, water temperatures, EGR rates, atmospheric pressures, boost pressures and others] other than engine speeds Ne and fuel injection quantities Q.

However, these parameters have influence on the exhaust gas temperature, and if the values thereof differ largely from the values at the conversion of the expected exhaust gas temperature Te' into data, the influence cannot be disregarded.

Figure 7:
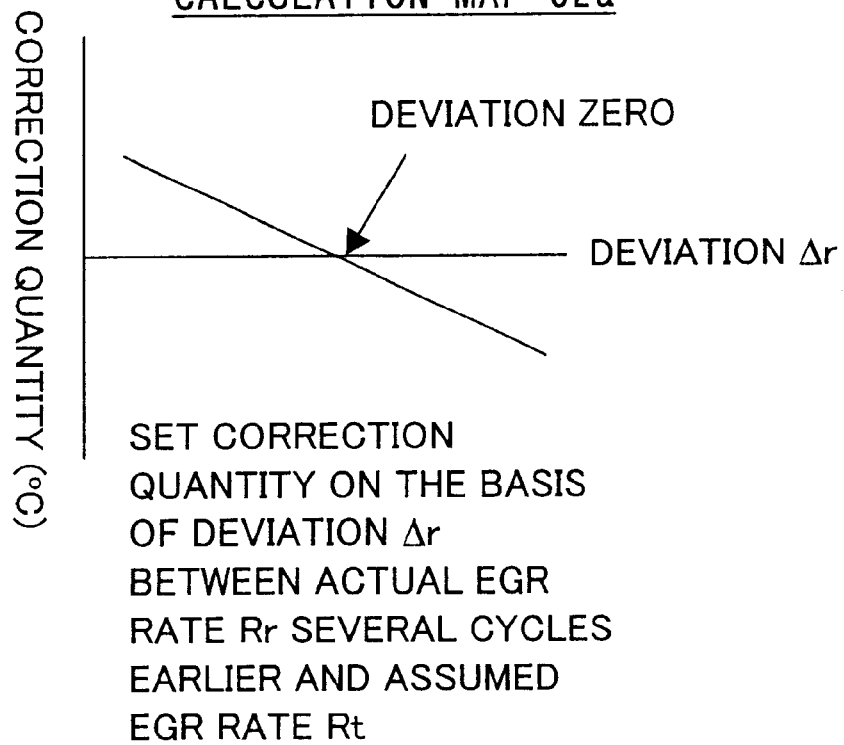
FIG. 7 is an illustration useful for explaining an operation of the EGR control unit according to the second embodiment of the invention.
Figure 8:
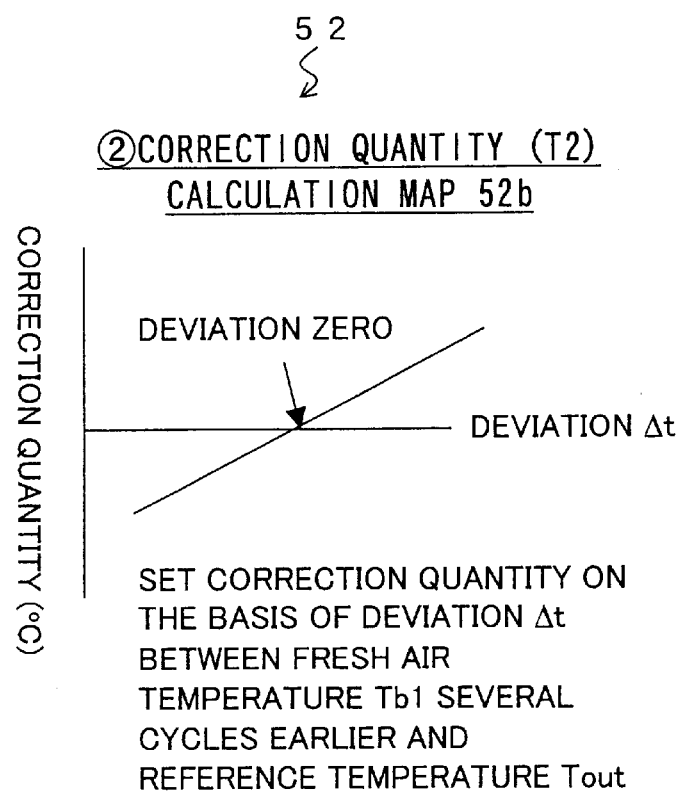
FIG. 8 is an illustration useful for explaining an operation of the EGR control unit according to the second embodiment of the invention.

For this reason, for more accurate estimation of the exhaust gas temperature, the exhaust gas temperature estimating means 50 includes correction quantity calculating maps 52 shown in FIGS. 7 and 8.

The correction quantity calculating map 52a shown in FIG. 7 is for calculating a correction quantity T1 while taking note of EGR rates, and concretely, the correction quantity T1 is calculated as follows.

First, a calculation is made to obtain a deviation Δr(=Rr−Rt) between an actual EGR rate Rr calculated several cycles (the number of cycles is determined in accordance with an engine speed) earlier, affecting the exhaust gas temperature, and an EGR rate (assumed EGR rate) Rt in a driving condition at the time of the setting of the expected exhaust gas temperature Te'. A method of calculating the actual EGR rate Rr will be mentioned later. Moreover, the assumed EGR rate is separately stored in the ECU 30.

In addition, a correction quantity T1 is set from the correction quantity calculating map 52a on the basis of the obtained deviation Δr. In this case, as an example, as shown in FIG. 7, this correction quantity T1 is set at a negative value when the deviation Δr assumes a positive value (when the actual EGR rate is larger), while it is set at a positive value when the deviation Δr assumes a negative value (when the actual EGR rate is smaller).

On the other hand, the correction quantity calculating map 52b shown in FIG. 8 is for calculating a correction quantity T2 taking note of the fresh air temperature Tb1. Also in this case, a deviation Δt(=Tb1−Tout) between a fresh air temperature Tb1 detected by the temperature sensor 7 several cycles (the number of cycles is determined in accordance with an engine speed) earlier, affecting the exhaust gas temperature, and a fresh air temperature (estimated fresh air temperature) Tout in a driving condition at the time of the setting of the expected exhaust gas temperature Te' is calculated to set a correction quantity on the basis of the calculated deviation Δt. At this time, as one example, as shown in FIG. 8, this correction quantity T2 is set at a positive value when the deviation Δt assumes a positive value (when the fresh air temperature is higher), while it is set at a negative value when the deviation Δt assumes a negative value (when the fresh air temperature is lower).

Figure 9:
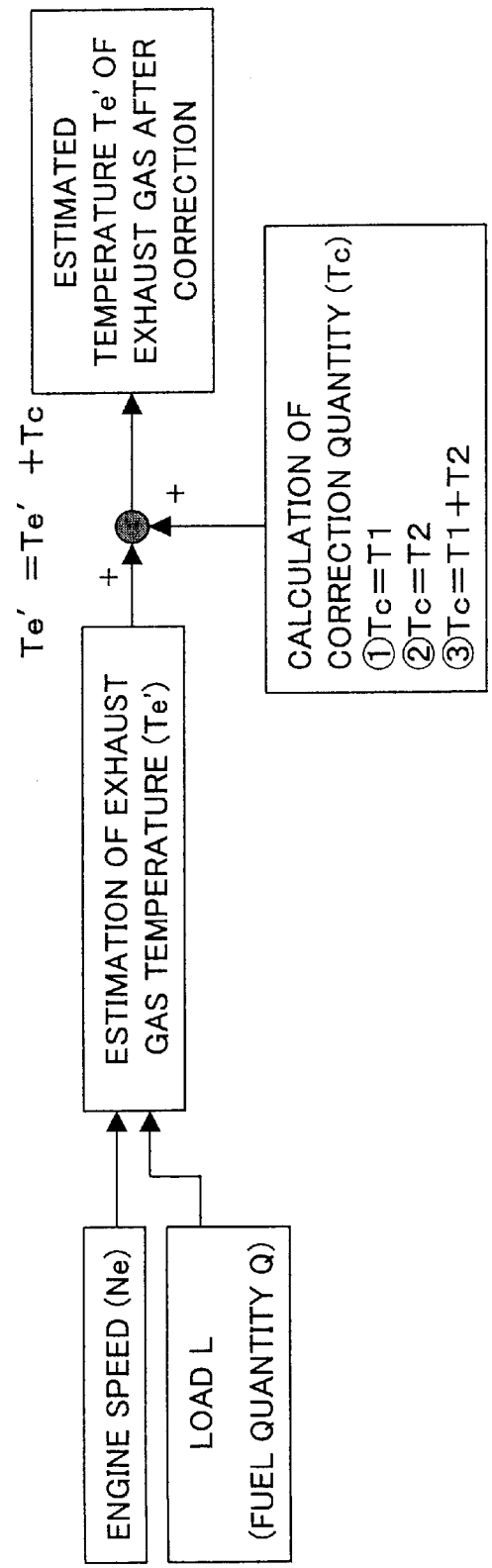
FIG. 9 is an illustration useful for explaining an operation of the EGR control unit according to the second embodiment of the invention.

When the correction quantities T1 and T2 are set in this way, the sum of the correction quantities T1 and T2 is set as a correction quantity Tc according to the following equation (21) (see circled numeral 3 in FIG. 9).

$$Tc = T1 + T2 \tag{21}$$

In addition, this correction quantity Tc is added to the expected exhaust gas temperature Te', obtained from the exhaust gas temperature estimating map 51, according to the following equation (22), with the resultant valve being newly set as an expected exhaust gas temperature Te' (see circled numeral 3 in FIG. 9).

Expected Exhaust Gas Temperature Te' After Correction=Expected Exhaust Gas Temperature Te' Before Correction+Correction Quantity Tc (22)

In this connection, although in the above description the expected exhaust gas temperature Te' is corrected through the use of both the actual EGR rate and fresh air temperature, it is also acceptable to use one of a correction quantity T1 set on the basis of the actual EGR rate and a correction quantity T2 set from the fresh air temperature.

Moreover, the parameters for the correction of the expected exhaust gas temperature Te' are not limited to those mentioned above, but various kinds of parameters are employable as long as they affect the exhaust gas temperature. Concretely, it is possible to use diverse parameters, such as oil temperature, water temperature, atmospheric pressure, intake pressure, boost pressure and others. Still moreover, it is also appropriate that the correction quantity Tc is set using all of these parameters, or that some are properly selected therefrom for setting the correction quantity Tc. In this case, it is also appropriate to examine the degree of influence on the exhaust gas temperature through tests or the like for preferentially using the parameters relatively high in the degree of influence on the exhaust gas temperature.

When the expected exhaust gas temperature Te' is obtained in the manner mentioned above, an actual EGR rate is calculated according to the following equation (23).

$$R = (Tb2 - Tb1)/(Te' - Tb1) \tag{23}$$

That is, it is possible to calculate the actual EGR rate by substituting the expected value Te' of the EGR gas temperature estimated by the aforesaid exhaust gas temperature estimating means 50 for the EGR gas temperature Te in the actual EGR rate calculation equation (6) according to the first embodiment.

The control, failure judgment and others for the EGR apparatus 10 are the same as those in the first embodiment, and the description thereof will be omitted for brevity.

Since the EGR control unit according to the second embodiment of the present invention is arranged as described above, in addition to the effects of the first embodiment, the number of temperature sensors is reducible, which leads to further cost reduction. Moreover, since the expected exhaust gas temperature Te' is corrected on the basis of the parameters having influence on the exhaust gas temperature, it is possible to offer an advantage of calculating the EGR rate with high accuracy but at a low cost.

Furthermore, a description will be given hereinbelow of a modification of the second embodiment. The only difference of this modification from the second embodiment is a method of correcting the exhaust gas temperature Te' estimated from the exhaust gas temperature estimating map 51, and the other arrangement is the same as that of the above-described second embodiment.

Figure 10:
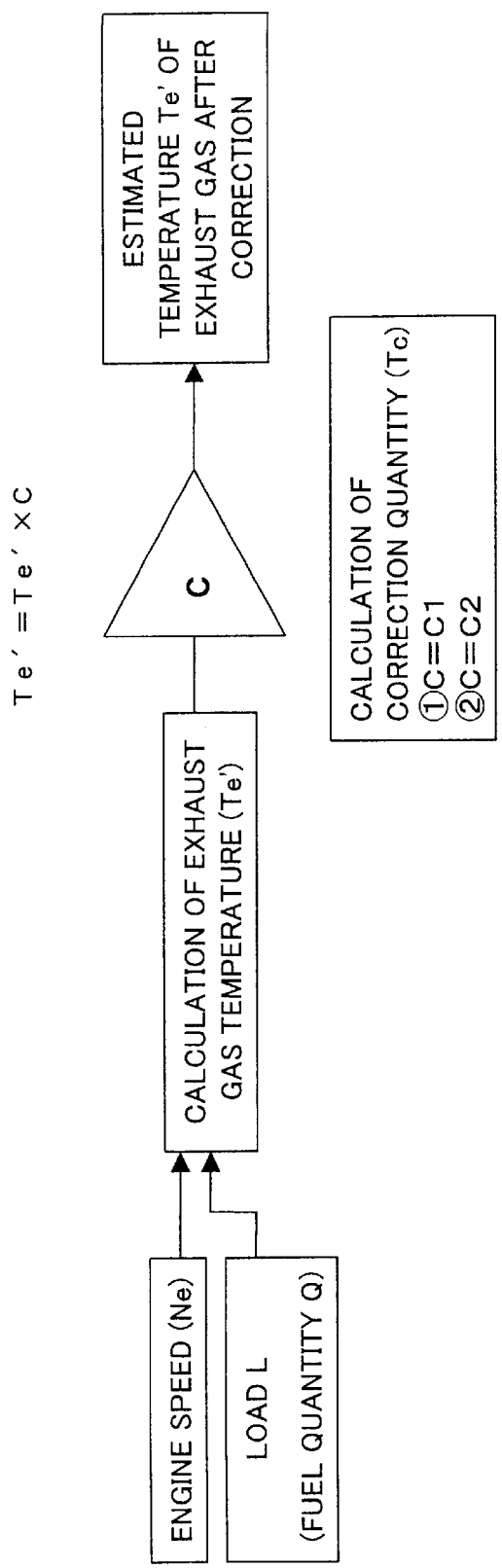
FIG. 10 is an illustration useful for explaining an operation of a modification of the EGR control unit according to the second embodiment of the invention.

That is, as FIG. 10 shows, in this modification, a correction coefficient C is set with respect to the exhaust gas temperature Te' estimated from the exhaust gas temperature estimating map 51, and a value obtained by multiplying the exhaust gas temperature Te' by the correction coefficient C as expressed by the following equation (24) is newly set as an expected exhaust gas temperature Te'.

Expected Exhaust Gas Temperature Te' After Correction=Expected Exhaust Gas Temperature Te' Before Correction x Correction Coefficient C (24)

A description will be given here of the setting of the correction coefficient C (=C1, C2). The exhaust gas temperature estimating means 50 is equipped with a correction coefficient setting map which is for setting the correction coefficient C1, C2 as a function of a parameter (in this case, an actual EGR rate or a fresh air temperature) which has influence on the exhaust temperature. Although not shown, this correction coefficient map has a characteristic similar to that of the map shown in FIG. 7 or 8, and the correction coefficient C1, C2 is set in a manner similar to that for the correction quantities T1 and T2.

That is, a calculation is made to obtain a deviation Δr (=Rr−Rt) between an actual EGR rate Rr calculated several cycles (the number of cycles is determined in accordance with an engine speed) earlier, affecting the exhaust gas temperature, and an EGR rate (assumed EGR rate) Rt in a driving condition at the time of the setting of the expected exhaust gas temperature Te', or to obtain a deviation Δt (=Tb1−Tout) between a fresh air temperature Tb1 detected by the temperature sensor 7 the several cycles earlier and a fresh air temperature (estimated fresh air temperature) Tout in a driving condition at the time of the setting of the expected exhaust gas temperature Te', thereby setting the correction coefficient C1, C2 from the correction coefficient setting map on the basis of the deviation Δr or Δt.

Moreover, as well as the correction quantity setting map shown in FIG. 7, the correction coefficient C1 is set at a value smaller than 1.0 when the deviation Δr is a positive value (when the actual EGR rate is larger), and is set at a value equal to or larger than 1.0 when the deviation Δr is a negative value (when the actual EGR rate is smaller).

On the other hand, as well as the correction quantity setting map shown in FIG. 8, the correction coefficient C2 is set at a value equal to or larger than 1.0 when the deviation Δt is a positive value (the fresh air temperature is higher), and is set at a value smaller than 1.0 when the deviation Δt is a negative value (the fresh air temperature is smaller).

When the correction coefficients C1 and C2 are set in this way, one of them is set as a correction coefficient C and the correction of the estimated exhaust gas temperature Te' is implemented according to the above-mentioned equation (24).

The above-mentioned correction of the estimated exhaust gas temperature Te' can provide the effects similar to those of the second embodiment. Incidentally, it is also appropriate that the correction coefficient C is set as the product of the correction coefficients C1 and C2 (C1−C2), or that the correction coefficient C is set as an average value [(C1+C2)/2] of the correction coefficients C1 and C2.

Moreover, the parameters for the correction of the expected exhaust gas temperature Te' are not limited to those mentioned above, but various kinds of parameters, such as oil temperature, water temperature, atmospheric pressure, intake pressure, boost pressure and others, are employable as long as they affect the exhaust gas temperature. Still moreover, it is also appropriate that the correction coefficient C is set using all of these parameters, or that some are properly selected therefrom for setting the correction coefficient C. In this case, it is also appropriate to examine the degree of influence on the exhaust gas temperature through tests or the like for preferentially using the parameters relatively high in the degree of influence on the exhaust gas temperature.

In addition, it is also appropriate that each of the correction coefficient C and the aforesaid correction quantity Tc in the second embodiment is set and properly used as needed. Still additionally, it is also appropriate that a correction of predetermined parameters is made by adding the correction quantity Tc thereto while a correction of parameters other than the predetermined parameters is made by multiplying them by the correction coefficient C.

Still additionally, although in the second embodiment described above the expected exhaust gas temperature is corrected on the basis of the comparison between, of parameters affecting the expected exhaust gas temperature, a value at the exhaust gas temperature estimation and a value at the conversion of the expected exhaust gas temperature into data, it is also appropriate that the actual EGR rate R obtained through the calculation is corrected in a similar manner.

That is, an actual EGR rate R is calculated according to the above-mentioned equation (23) on the basis of an expected exhaust gas temperature Te' before the correction made using an interflow gas temperature Tb2, an atmospheric temperature Tb1 and the parameter, and the actual EGR rate R calculated is corrected on the basis of the comparison between, of the parameters affecting the expected exhaust gas temperature, a value at the conversion of the expected exhaust gas temperature into data and a value at the exhaust gas temperature estimation.

Furthermore, referring to FIG. 11, a description will be given hereinbelow of an EGR apparatus according to a third embodiment of the present invention.

In this third embodiment, an atmospheric temperature Tb1 is estimated using an outside temperature according to a method described in the modification of the second embodiment, and the other arrangement are similar to that of each of the above-described embodiments.

Accordingly, the following description will mainly be given of a method of calculating an actual EGR rate in the third embodiment, and the description of the arrangements other than this will be omitted because they are similar to those of the first embodiment.

Although in the above-described second embodiment an EGR gas temperature Te is estimated from an engine driving condition, in the third embodiment, a temperature sensor 9 for detecting an outside air temperature is placed in place of the temperature sensor (second temperature detecting element) placed in the atmospheric air introduction passage 2a in the first embodiment, and an atmospheric temperature (or an intake temperature) Tb1' is assumed from an outside air temperature To detected by the outside air temperature sensor 9.

Figure 11:
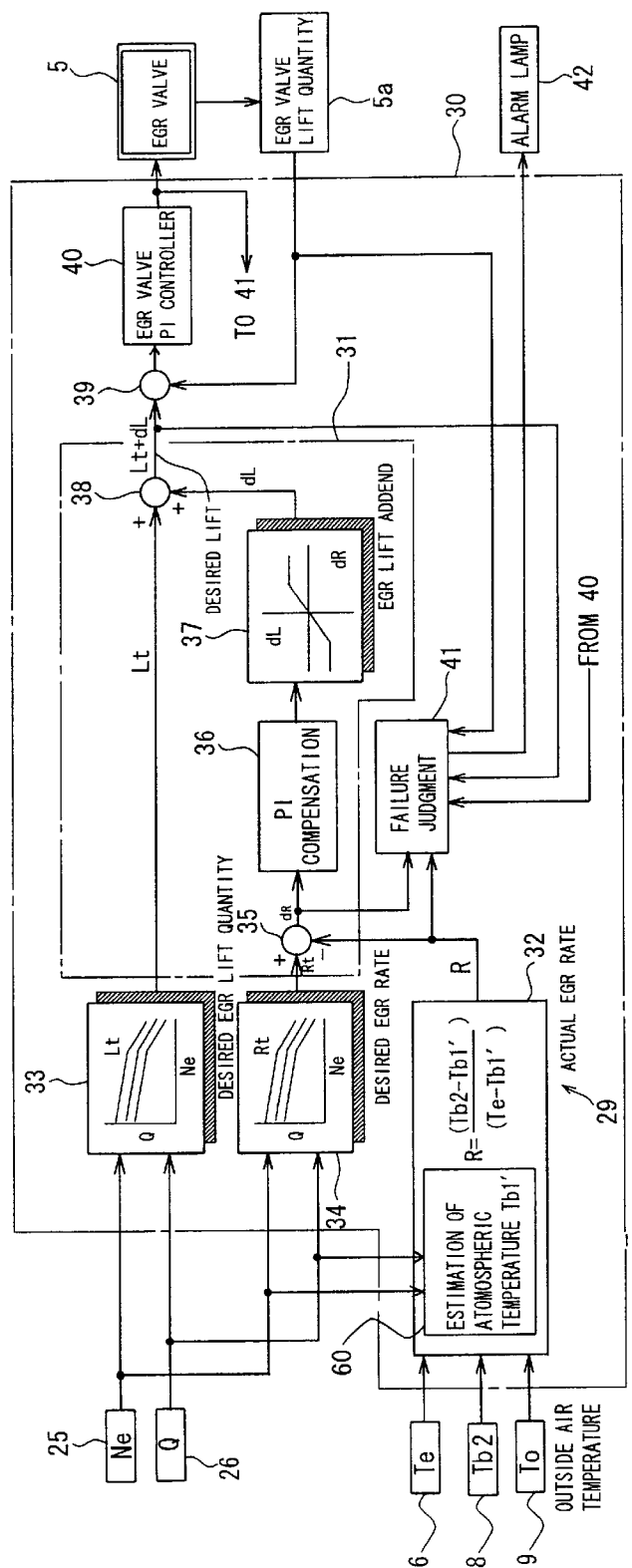
FIG. 11 is a block diagram taking note of functions of an EGR control unit according to a third embodiment of the invention.

In a detailed description, as FIG. 11 shows, there are provided a temperature sensor (first temperature detecting element) 6 for detecting a temperature Te of an EGR gas passing through an EGR passage 4, a temperature sensor (third temperature detecting element) 8 for detecting a temperature (gas temperature in the intake passage)of an interflow gas forming a mixture of an EGR gas and fresh air, and a temperature sensor (fourth temperature detecting element) 9 for detecting an outside air temperature at an upstream side of the atmospheric air introduction passage 2a. These temperature sensors 6, 8 and 9 constitute a temperature detecting means.

In addition, an actual EGR rate calculating means 29 of an ECU 40 internally includes an expected atmospheric temperature estimating means 60 for estimating an atmospheric temperature (intake temperature) Tb1' in the atmospheric air introduction passage 2a on the basis of information from the respective temperature sensors.

Still additionally, in the third embodiment, an atmospheric temperature Tb1' is estimated by the expected atmospheric temperature estimating means 60 and an actual EGR rate is calculated on the basis of the estimated atmospheric temperature Tb1'.

In this connection, as well as the above-described second embodiment, it is also appropriate that an outside air temperature To detected by the temperature sensor 9 is corrected using parameters (concretely, a cooling water temperature, an oil temperature, an EGR rate, a boost pressure, and others) affecting the expected atmospheric temperature. Moreover, it is also appropriate that an atmospheric temperature Tb1' estimated on the basis of the outside air temperature To is corrected using the parameters affecting the expected atmospheric temperature. Still moreover, it is also appropriate that the actual EGR rate R calculated is corrected using the parameters affecting the expected atmospheric temperature Tb1'.

Concretely, for example, in the case of a natural intake engine, the expected atmospheric temperature estimating means 60 corrects the outside air temperature To, detected by the temperature sensor 9, on the basis of an engine temperature (a cooling water temperature, an oil temperature, or the like). That is, when the engine temperature is higher than a predetermined temperature, since the temperature of the engine room increases and the outside air temperature To detected by the temperature sensor 9 can rise while the outside air passes through the atmospheric air introduction passage 2a, a correction quantity Ta or correction coefficient Ca is set in accordance with the engine temperature and the outside air temperature To detected by the aforesaid temperature sensor 9 is corrected toward a higher-temperature side, thereby obtaining an expected atmospheric temperature tb1'.

Moreover, for example, in the case of am engine with a supercharger, since the efficiency of the supercharger varies with the engine temperature or the EGR rate, it is preferable that, in addition to the aforesaid correction based on the engine temperature in the case of the natural intake engine, the expected atmospheric temperature estimating means 60 corrects the outside air temperature To, detected by the temperature sensor 9, on the basis of the EGR rate or the engine temperature, thereby obtaining an expected atmospheric temperature Tb1'.

A description will be given hereinbelow of the variation of the efficiency of the supercharger based on the engine temperature. For example, in the case of a low engine temperature, the combustion temperature drops to lower the exhaust gas temperature. In other words, since the thermal energy contained in the exhaust gas falls, the driving energy of an exhaust turbine decreases even at the same engine speed and at the same load, thereby lowering the efficiency of the supercharger.

In consequence, the boost pressure drops due to the drop of the rotational speed of a compressor placed coaxially with the exhaust turbine, and the temperature of fresh air passing through the atmospheric air introduction passage 2a lowers finally.

Thus, for example, the expected atmospheric temperature estimating means 60 corrects the outside air temperature To, detected by the temperature sensor 9, toward the higher-temperature side as the engine temperature increases after exceeding a predetermined temperature.

In addition, in the case of an engine with a supercharger, it is also appropriate that the expected atmospheric temperature estimating means 60 corrects an outside air temperature To, detected by the temperature sensor 9, on the basis of a boost pressure forming a parameter affecting the expected atmospheric temperature, in place of the engine temperature or the EGR rate, thereby obtaining an expected atmospheric temperature Tb1'.

Still additionally, it is also appropriate that, of a rise of the ambient air temperature stemming from an increase in engine temperature and a variation (including a variation of boost pressure) of the supercharger efficiency based on the engine temperature or EGR rate, one which affects the expected atmospheric temperature a greater extent is selected as a parameter so that the correction of the outside air temperature is made through the use of this parameter.

When the expected atmospheric temperature Tb1' is obtained in this way, an actual EGR rate is calculated according to the following equation (25).

$$R=(Tb2-Tb1')/(Te-Tb1') \qquad (25)$$

That is, the actual EGR rate can be calculated by substituting an expected value Tb1' of the atmospheric temperature, estimated by the aforesaid expected atmospheric temperature estimating means, for the atmospheric temperature Tb1 in the actual EGR rate calculation equation (6) in the first embodiment.

Incidentally, the control, trouble judgment and others for the EGR apparatus 10 are similar to those in the first embodiment, and the description thereof will be omitted for simplicity.

In the third embodiment, it is also acceptable that the actual EGR rate is calculated by substituting an expected value Tb1' of the atmospheric temperature, estimated by the aforesaid expected atmospheric temperature estimating means, for the atmospheric temperature Tb1 in the actual EGR rate calculation equation (23) in the second embodiment. That is, the actual EGR rate can also be calculated according to the following equation (26) on the basis of an expected atmospheric temperature Tb1', an interflow gas temperature Tb2 and an expected exhaust gas temperature Te' estimated in the above-described second embodiment.

$$R=(Tb2-Tb1')/(Te'-Tb1') \qquad (26)$$

Although the embodiments of the present invention have been described above, it should be understood that the present invention is not limited to the above-described embodiments and the modifications thereof, and that it is intended to cover all changes of the embodiments and the modifications herein which do not constitute departures from the spirit and scope of the invention.

What is claimed is:

1. An EGR control unit comprising:
   an EGR passage for making a communication between an exhaust passage and an intake passage in an internal combustion engine;
   an EGR adjusting device including at least an EGR valve for opening and closing said EGR passage and drive means for driving said EGR valve;
   temperature detecting means for detecting in-passage temperature of at least two passages of said intake passage, an atmospheric air introduction passage located on an upstream side of said intake passage and communicated with the atmosphere and said EGR passage;
   actual EGR rate calculating means for calculating a rate of an exhaust gas to an intake gas to said internal combustion engine on the basis of detection information from said temperature detecting means; and
   EGR control means for controlling said EGR adjusting device through the use of the actual EGR rate calculated by said actual EGR rate calculating means.

2. An EGR control unit according to claim 1, wherein said EGR control means controls said EGR adjusting device so that said actual EGR rate becomes a target EGR rate set in accordance with a driving condition of said internal combustion engine.

3. An EGR control unit according to claim 1, wherein said EGR adjusting device includes EGR valve opening degree detecting means for detecting an actual opening degree of said EGR valve, and said EGR control means controls said EGR adjusting device so that said actual opening degree of said EGR valve detected by said EGR valve opening degree detecting means becomes a target opening degree set in accordance with a driving condition of said internal combustion engine and controls said EGR adjusting device on the basis of a deviation between a target EGR rate set in accordance with said driving condition of said internal combustion engine and said actual EGR rate for correcting said actual opening degree of said EGR valve.

4. An EGR control unit according to claim 1, wherein said temperature detecting means includes a first temperature detecting element placed in said EGR passage, a second temperature detecting element placed in said atmospheric air introduction passage, and a third temperature detecting element placed in said intake passage.

5. An EGR control unit according to claim 4, wherein said actual EGR rate calculating means calculates the actual EGR rate R on the basis of an exhaust gas temperature Te, an atmospheric temperature Tb1 and an gas temperature Tb2 in said intake passage, respectively detected by said first, second and third temperature detecting elements, according to an equation:

$R=(Tb2-Tb1)/(Te-Tb1)$.

6. An EGR control unit according to claim 1, wherein said temperature detecting means includes a fourth temperature detecting element for detecting an outside air temperature at an upstream side of said atmospheric air introduction passage and a third temperature detecting element placed in said intake passage,
   said actual EGR rate calculating means includes an exhaust gas temperature estimating means for estimating an expected exhaust gas temperature on the basis of a driving condition of said internal combustion engine and an atmospheric temperature estimating means for estimating an atmospheric temperature in said atmospheric air introduction passage on the basis of said outside air temperature detected by said fourth temperature detecting element, and
   said actual EGR rate calculating means obtains an actual EGR rate on the basis of an expected atmospheric temperature Tb1' obtained by said atmospheric temperature estimating means, a gas temperature Tb2 in said intake passage detected by said third temperature detecting element and an expected exhaust gas temperature Te' obtained by said exhaust gas temperature estimating means.

7. An EGR control unit according to claim 6, wherein said actual EGR rate calculating means calculates an actual EGR rate according to an equation:

$R=(Tb2-Tb1')/(Te'-Tb1')$.

8. An EGR control unit according to claim 1, wherein said EGR control means makes a judgment as to the presence or absence of a failure of said EGR adjusting device on the basis of a result of comparison between a target EGR rate set in accordance with a driving condition of said internal combustion engine and said actual EGR rate calculated by said actual EGR rate calculating means.

9. An EGR control unit according to claim 8, wherein said EGR adjusting device includes EGR valve opening degree detecting means for detecting an actual opening degree of said EGR valve, and when the judgment shows the presence of a failure of said EGR adjusting device, said EGR control means makes a judgment to locate a place of the failure in said EGR adjusting device on the basis of a target opening degree of said EGR valve set in accordance with a driving condition of said internal combustion engine and an actual opening degree detected by said EGR valve opening degree detecting means.

10. An EGR control unit according to claim 1, wherein said temperature detecting means includes a first temperature detecting element placed in said EGR passage, a third temperature detecting element placed in said intake passage and a fourth temperature detecting element for detecting an outside air temperature at an upstream side of said atmospheric air introduction passage,
    said actual EGR rate calculating means includes atmospheric temperature estimating means for estimating an atmospheric temperature in said atmospheric air introduction passage on the basis of an outside air temperature detected by said fourth temperature detecting element, and
    said EGR rate calculating means obtains an actual EGR rate on the basis of an expected atmospheric temperature Tb1' obtained by said atmospheric temperature estimating means, a gas temperature Tb2 in said intake passage detected by said third temperature detecting element and an exhaust gas temperature Te detected by said first temperature detecting element.

11. An EGR control unit according to claim 10, wherein said actual EGR rate calculating means calculates an actual EGR rate R according to an equation:

$R=(Tb2-Tb1')/(Te-Tb1')$.

12. An EGR control unit according to claim 10, wherein said atmospheric temperature estimating means corrects said expected atmospheric temperature Tb1' on the basis of a parameter which affects an exhaust gas temperature.

13. An EGR control unit according to claim 1, wherein said temperature detecting means includes a second temperature detecting element placed in said atmospheric air introduction passage and a third temperature detecting element placed in said intake passage, and said actual EGR rate calculating means includes exhaust gas temperature estimating means for estimating an expected exhaust gas temperature on the basis of a driving condition of said internal combustion engine, said actual EGR rate calculating means obtaining an actual EGR rate R as a function of an atmospheric temperature Tb1 detected by said second temperature detecting element, an intake passage gas temperature Tb2 detected by said third temperature detecting element and an expected exhaust gas temperature Te' obtained by said exhaust gas temperature estimating means.

14. An EGR control unit according to claim 13, wherein said actual EGR rate calculating means calculates said actual EGR rate R according to an equation:

$$R=(Tb2-Tb1)/(Te'-Tb1).$$

15. An EGR control unit according to claim 13, wherein said exhaust gas temperature estimating means corrects said expected exhaust gas temperature Te' on the basis of a parameter which affects exhaust gas temperature.

16. An EGR control unit according to claim 15, wherein said exhaust gas temperature estimating means corrects said expected exhaust gas temperature Te' on the basis of said atmospheric temperature Tb1 detected by said second temperature detecting element.

17. An EGR control unit according to claim 16, wherein said exhaust gas temperature estimating means corrects said expected exhaust gas temperature Te' on the basis of a deviation between a reference outside air temperature at the time of conversion of said expected exhaust gas temperature Te' into data and said atmospheric temperature Tb1.

18. An EGR control unit according to claim 15, wherein said exhaust gas temperature estimating means corrects said expected exhaust gas temperature Te' on the basis of said actual EGR rate calculated by said actual EGR rate calculating means.

19. An EGR control unit according to claim 18, wherein said exhaust gas temperature estimating means corrects said expected exhaust gas temperature Te' on the basis of deviation between an assumed EGR rate corresponding to a driving condition of said internal combustion engine at the time of the conversion of said expected exhaust gas temperature Te' into data and said actual EGR rate.

20. An EGR control method of controlling an EGR adjusting device including at least an EGR passage for making a communication between an exhaust passage and an intake passage in an internal combustion engine, an EGR valve for opening and closing said EGR passage and drive means for driving said EGR valve, with an actual EGR rate to an intake gas in said internal combustion engine being calculated on the basis of information on in-passage temperatures of at least two of said intake passage, an atmospheric air introduction passage located on an upstream side of said intake passage and communicated with atmosphere and said EGR passage so that said EGR adjusting device is controlled on the basis of the calculated actual EGR rate.

21. An EGR control method according to claim 20, wherein said actual EGR rate is calculated on the basis of information on in-passage temperatures of said intake passage, said atmospheric air introduction passage and said EGR passage.

22. An EGR control method according to claim 20, wherein said actual EGR rate R is calculated on the basis of an exhaust gas temperature Te in said EGR passage, an atmospheric temperature Tb1 in said atmospheric air introduction passage and an gas temperature Tb2 in said intake passage according to an equation:

$$R=(Tb2-Tb1)/(Te-Tb1).$$

23. An EGR control method according to claim 20, wherein said actual EGR rate R is calculated on the basis of an expected exhaust gas temperature Te' based on an engine driving condition, an atmospheric temperature Tb1 in said atmospheric air introduction passage and a gas temperature Tb2 in said intake passage according to an equation:

$$R=(Tb2-Tb1)/(Te'-Tb1).$$

24. An EGR control method according to claim 20, wherein said actual EGR rate R is calculated on the basis of an exhaust gas temperature Te in said EGR passage, an expected atmospheric temperature Tb1' based on an outside air temperature at an upstream side of said atmospheric air introduction passage and a gas temperature Tb2 in said intake passage according to an equation:

$$R=(Tb2-Tb1')/(Te-Tb1').$$

25. An EGR control method according to claim 20, wherein said EGR adjusting device includes EGR valve opening degree detecting means for detecting an actual opening degree of said EGR valve, while said EGR adjusting device is controlled so that an actual opening degree of said EGR valve detected by said EGR valve opening degree detecting means becomes a target opening degree set in accordance with a driving condition of said internal combustion engine and said EGR adjusting device is controlled on the basis of a deviation between said target EGR rate set in accordance with said driving condition of said internal combustion engine and said actual EGR rate for correct said actual opening degree of said EGR valve.

26. An EGR control method according to claim 20, wherein a judgment on the presence or absence of a failure of said EGR adjusting device is made on the basis of a result of comparison between said target EGR rate set in accordance with said driving condition of said internal combustion engine and the calculated actual EGR rate.

27. An EGR control method according to claim 20, wherein said EGR adjusting device is controlled so that said actual EGR rate becomes a target EGR rate set in accordance with a driving condition of said internal combustion engine.

28. An EGR control method according to claim 27, wherein said EGR adjusting device includes EGR valve opening degree detecting means for detecting an actual opening degree of said EGR valve, and when the judgment shows the presence of a failure in said EGR adjusting device, a judgment on a location of a failure in said EGR adjusting device is made on the basis of a target opening degree of said EGR valve set in according with a driving condition of said internal combustion engine and said actual opening degree detected by said EGR valve opening degree detecting means.

* * * * *